L. E. WATERMAN.
DISK HARROW.
APPLICATION FILED OCT. 6, 1911.
1,104,748.
Patented July 21, 1914.
2 SHEETS—SHEET 1.
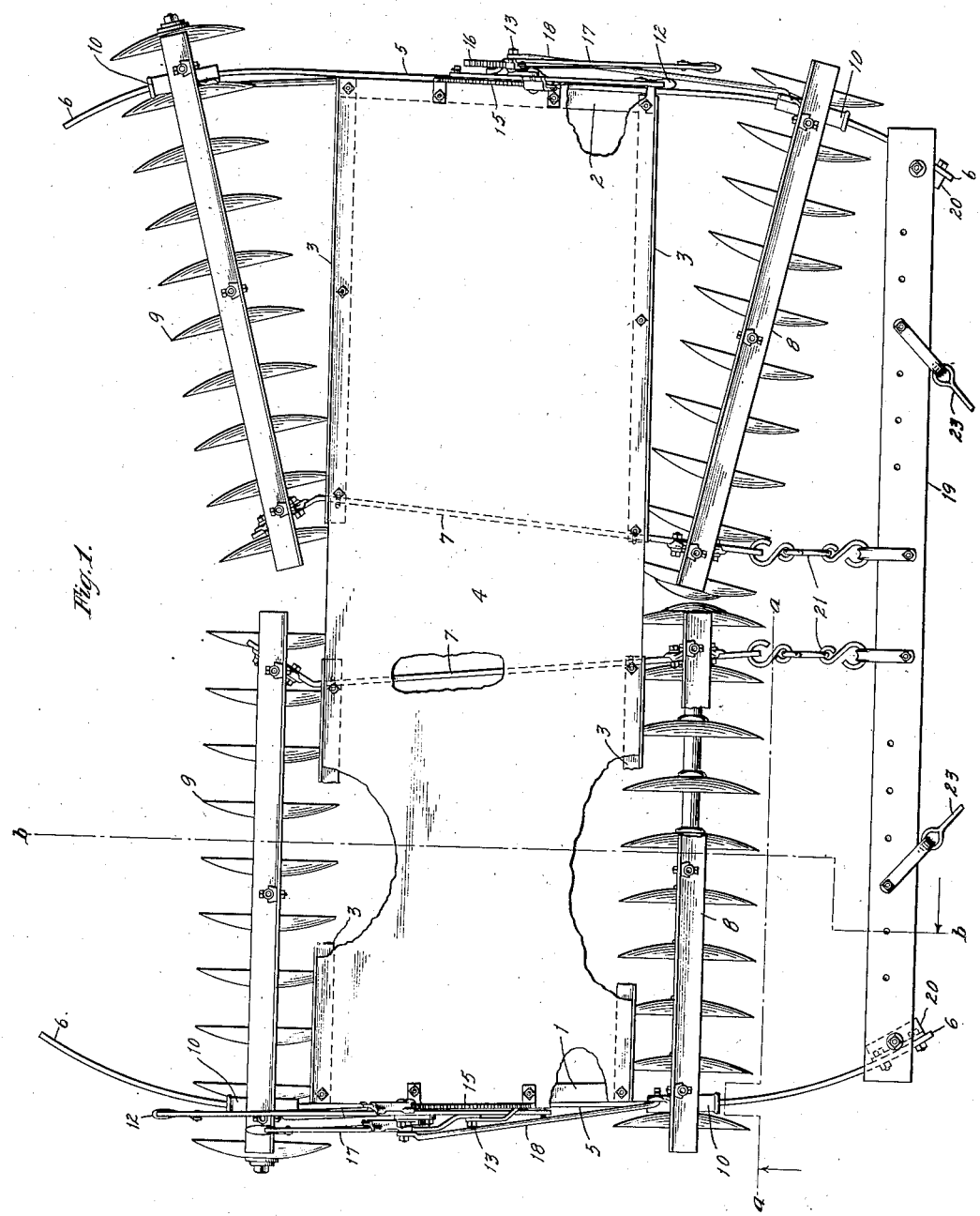

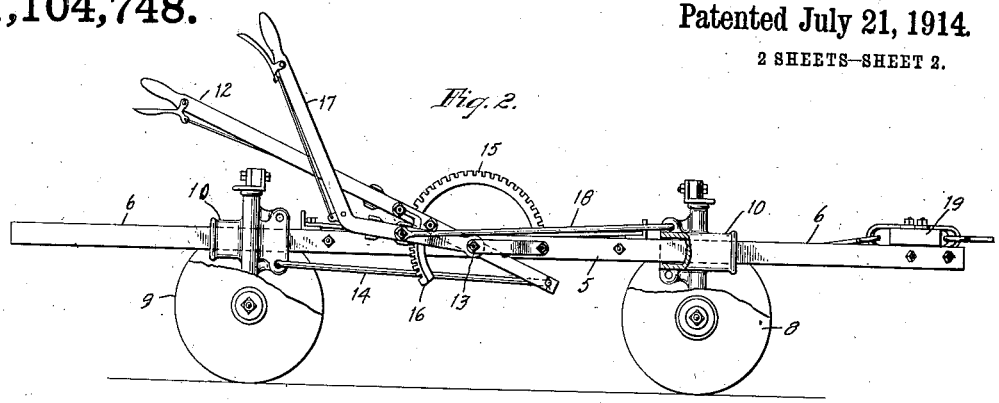
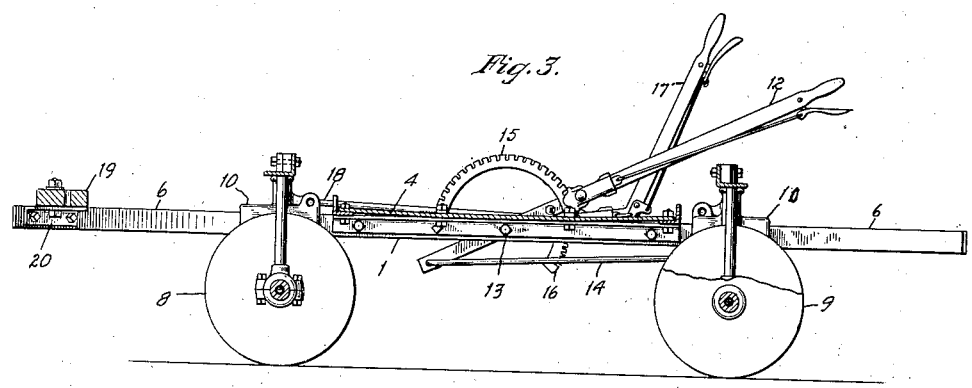
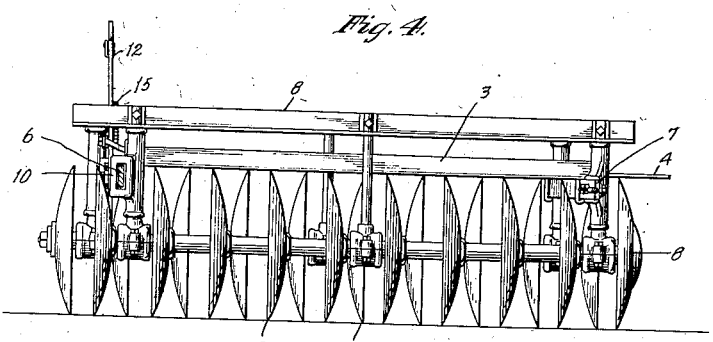
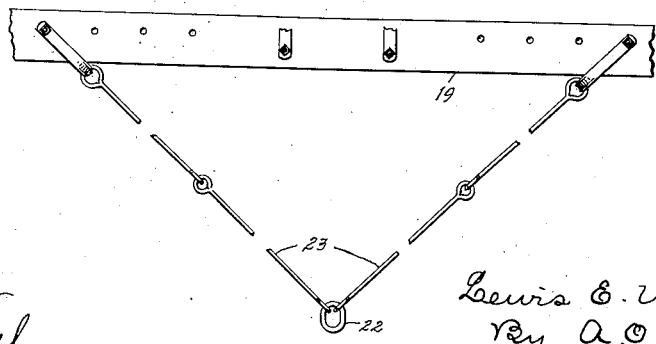

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

DISK HARROW.

1,104,748.   Specification of Letters Patent.   Patented July 21, 1914.

Application filed October 6, 1911. Serial No. 653,242.

*To all whom it may concern:*

Be it known that I, LEWIS E. WATERMAN, a citizen of the United States, residing at Rockford, in the county of Winnebago and State of Illinois, have invented certain new and useful Improvements in Disk Harrows, of which the following is a specification.

The object of this invention is to construct a disk harrow especially adapted to be drawn by a traction engine.

In the accompanying drawings, Figure 1 is a plan view. Fig. 2 is an end elevation. Fig. 3 is a section on line b b Fig. 1. Fig. 4 is a section on line a a Fig. 1. Fig. 5 is a plan view of the hitch.

The frame of the harrow comprises the two end bars 1 and 2 connected by the side bars 3. A platform 4 is secured to the end and side bars of the frame. To each of the end bars 1 and 2 is secured a bar 5 having curved ends 6 projecting beyond the edges of the platform 4. Transverse and centrally of the platform 4 are secured two bars 7 having their ends projecting beyond the platform. To the ends of the bars 7 projecting beyond the front edges of the platform are pivotally connected two disk gangs 8 and to the ends of these bars projecting beyond the rear edges of the platform are pivotally connected two disk gangs 9.

Guides 10 are slidably mounted on the front and rear ends respectively of the curved sections 6 of the bars 5, and the outer ends of the disk gangs 8 and 9 are pivotally connected to these guides.

Two hand levers 12 one for each of the rear disk gangs, are pivoted to the bars 5 on the bolt 13. A rod 14 connects each lever below its fulcrum with the slidable guide 10 for the corresponding rear gang. A toothed segment 15 is provided for each of the levers 12 and are supported by the platform 4. To each of the levers 12 is secured a toothed segment 16, and a hand lever 17 is pivoted on the bolt 13 of each lever 12, and engage the tooth segment 16. A rod 18 connects the hand lever 17 above its fulcrum with the slidable guide 10 for the corresponding one of the front disk gangs.

A draft bar 19 is connected to the forward ends of the curved ends 6 of the bars 5 by the brackets 20 and connected to the forward ends of the bars 7 by the links 21. A draft link 22 is connected to the draft bar 19 by the links 23.

The harrow is drawn over the ground by being connected with a tractor and by means of the hand levers 12 all four disk gangs can be adjusted parallel with the sides of the platform or angularly with respect thereto. By means of the hand lever 17, the forward disk gangs can be adjusted independent of the rear disk gangs.

I claim as my invention.

1. A disk harrow comprising a platform, four disk gangs, two located at the front edge and two at the rear edge of the platform having their inner ends pivotally connected to the platform, curved guide-ways extending from the platform, a guide supported by each guide-way, and a pivotal connection between a disk gang and a guide-way.

2. In apparatus of the character set forth, the combination with a frame, of front and rear sets of disk gangs pivoted at their inner ends to the central portion of the frame, and means mounted on the outer portions of the frame and connected to the corresponding front and rear gangs for simultaneously swinging the latter.

3. In apparatus of the character set forth, the combination with a platform, of a front set of gangs pivoted at their inner ends to the central portion of the platform and arranged in advance of the same, a rear set of gangs pivoted at their inner ends to the central portion of the platform and arranged in rear of the same, and means mounted on the outer portions of the platform and connected to the gangs for swinging the corresponding front and rear gangs.

4. In apparatus of the character set forth, the combination with a platform, of transverse bars located on intermediate portions of the same and extending in advance and in rear thereof, front and rear sets of gangs pivoted to the projecting portions of the bars, and means mounted on the platform and connected to the gangs for swinging the same.

5. In apparatus of the character set forth, the combination with a support, of curved guides at the opposite outer ends of the same, front and rear sets of gangs pivoted to an intermediate portion of the support, boxes connected to the gangs and movable on the guides, and means for moving the gangs.

6. In apparatus of the character described, the combination with a support having portions projecting forwardly and rearwardly from central parts of the same, of front and rear disk gangs pivoted at their inner ends to the forwardly and rearwardly projecting portions, and means connected to the outer portions of the gangs for swinging the same and holding them in different angular positions.

In testimony whereof I have hereunto set my hand in presence of two subscribing witnesses.

LEWIS E. WATERMAN.

Witnesses:
A. O. BEHEL,
E. D. E. N. BEHEL.